Figure 1:
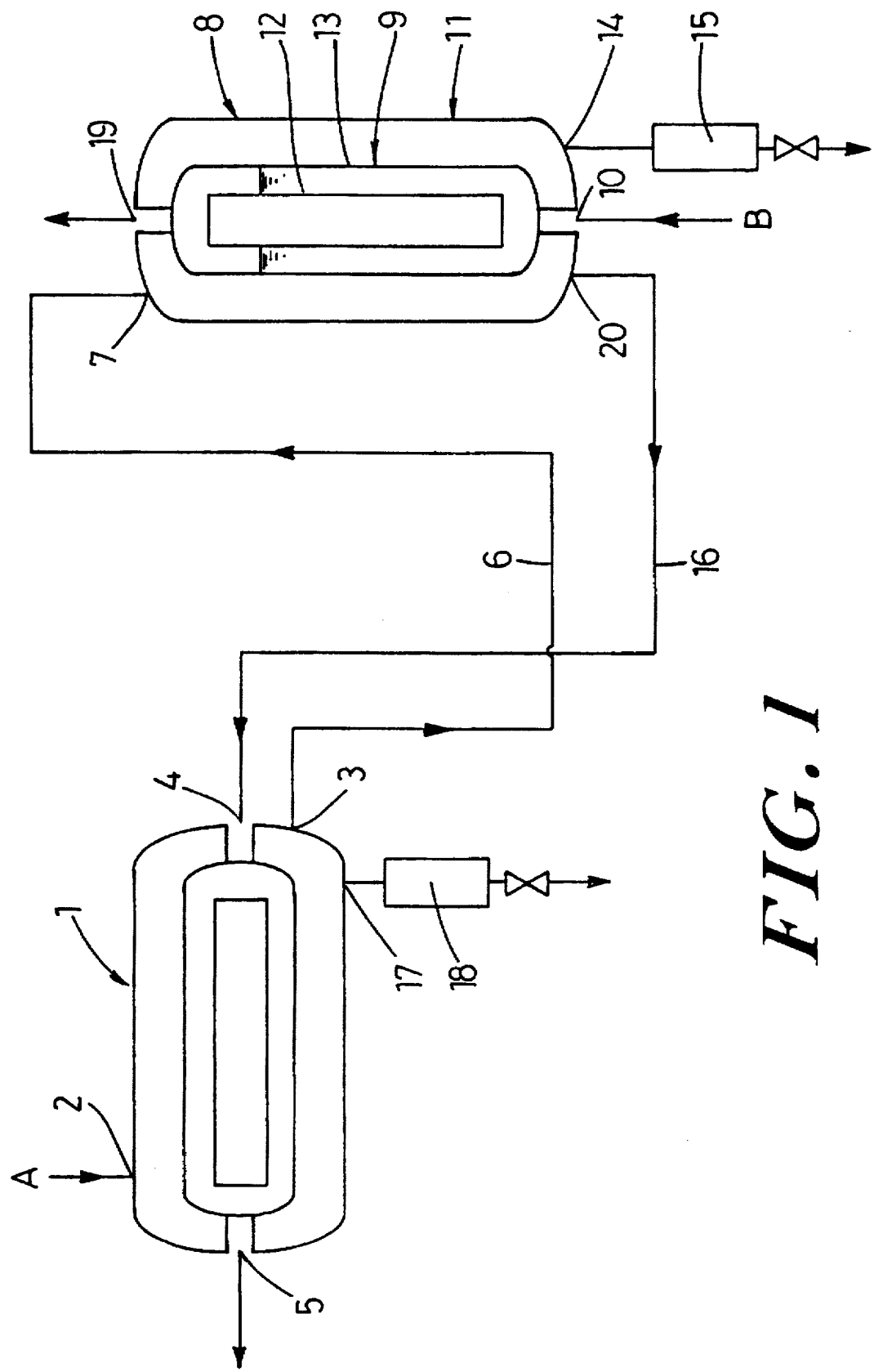

United States Patent [19]

Krabbendam

[11] Patent Number: 5,704,227
[45] Date of Patent: Jan. 6, 1998

[54] METHOD OF CONDENSING A VOLATILE COMPOUND OUT OF A GAS STREAM AND AN APPARATUS FOR THIS PURPOSE

[76] Inventor: Peter Jozef Krabbendam, Leeuwendalersstraat 41, 2026 AA Haarlem, Netherlands

[21] Appl. No.: 630,366

[22] Filed: Apr. 10, 1996

[30] Foreign Application Priority Data

Apr. 11, 1995 [NL] Netherlands ................ 1000109

[51] Int. Cl.⁶ .................................................. F25J 1/00
[52] U.S. Cl. .................................... 62/617; 62/616
[58] Field of Search ................... 62/614, 616, 617

[56] References Cited

U.S. PATENT DOCUMENTS

| | | | |
|---|---|---|---|
| 1,876,551 | 9/1932 | Barstow et al. | 62/617 |
| 3,374,637 | 3/1968 | Wenzke | 62/617 |
| 4,128,409 | 12/1978 | Bennett | 62/617 |
| 4,755,201 | 7/1988 | Eschwey et al. | 62/55.5 |
| 4,848,094 | 7/1989 | Davis et al. | 62/51.1 |

Primary Examiner—Ronald C. Capossela
Attorney, Agent, or Firm—Lahive & Cockfield, LLP

[57] ABSTRACT

A method and apparatus is provided for the condensation of one or more gasses out of a gas stream. The degree of the condensation of volatile compound out of the gas stream A is controlled by regulating the liquid level of the cooling agent in a heat exchanger (8). Preferably a gas stream A from which the volatile compound has been removed is led to a further heat exchanger (1) and is utilized to pre-cool the gas stream A that is still to be treated. In order to be able to control the degree of condensation of volatile compound out of the gas stream A as accurately as possible, the apparatus is provided with an elongated, vertical heat exchanger (8).

13 Claims, 2 Drawing Sheets

METHOD OF CONDENSING A VOLATILE COMPOUND OUT OF A GAS STREAM AND AN APPARATUS FOR THIS PURPOSE

The present invention relates to a method of condensing a volatile compound out of a gas stream, wherein the gas stream and a liquid cooling medium are led separately through a heat exchanger.

Such a method is generally known in the art. In said method the degree in which the volatile compound can be condensed out of the gas stream is, in respect of a particular apparatus and a particular gas flow rate, determined by the temperature, any liquid or solid phase already present on the heat-conducting surface of the heat exchanger and the flow rate of the liquid cooling medium.

The invention intends to provide a method in which an additional possibility is created for the control of the degree of condensation of volatile compound out of a gas stream.

To this end the invention provides a method in accordance with the preamble, wherein the gas stream is led through the heat exchanger with a vertical directional component in order to transfer heat from the gas stream to the cooling medium, and the degree in which the gas stream is cooled is regulated by varying the liquid level of the cooling agent in the heat exchanger.

The degree in which heat from the gas stream is transferred to the cooling liquid is varied by regulating the liquid level of the cooling agent. This means that the final temperature of the gas stream, and consequently the degree of condensation from the gas stream, can be controlled.

Preferably the gas stream is lead through the heat exchanger in a downward direction.

Leading the gas stream through the heat exchanger in the downward direction means that the gas stream first comes into contact with the upper, relatively warm part of the heat exchanger before coming into contact with the lower, relatively cold part of the heat exchanger, which part is in contact with the cooling liquid. This promotes efficient energy transfer.

According to a preferred embodiment the gas stream to be treated is first fed to a further heat exchanger and is pre-cooled in the further heat exchanger by means of the gas stream having been treated in the heat exchanger. Thus, energy is efficiently utilized.

The cooling medium is preferably liquefied gas, in particular liquid nitrogen.

By using liquefied gas a constant egress temperature of the gas stream, as it leaves the heat exchanger, can be maintained and the degree of cooling is at least substantially determined by the liquid level of the cooling agent in the heat exchanger.

The invention also relates to an apparatus for the condensation of a volatile compound out of a gas stream, which apparatus possesses a first heat exchanger having a first inlet opening and a first outlet opening for a gas stream that is to be treated, and a second inlet opening and a second outlet opening for the cooling medium.

Such an apparatus is characterized in that the first outlet opening is connected to a third inlet opening of a second heat exchanger, which second heat exchanger possesses a hollow body having a fourth inlet opening and a fourth outlet opening for a liquid cooling medium, while a second heat exchanger is furnished to lead the gas stream coming from first heat exchanger in a direction with a vertical component along the hollow body, the second heat exchanger possesses a third outlet opening for the gas stream which is connected with the second inlet opening of the first heat exchanger, and at least the second heat exchanger is provided with a drain for the condensate.

Such an apparatus makes it possible to efficiently condense (from gaseous condition to liquid condition) or to sublimate (from gaseous condition to solid condition) a volatile compound out of a gas stream.

Figure 2:
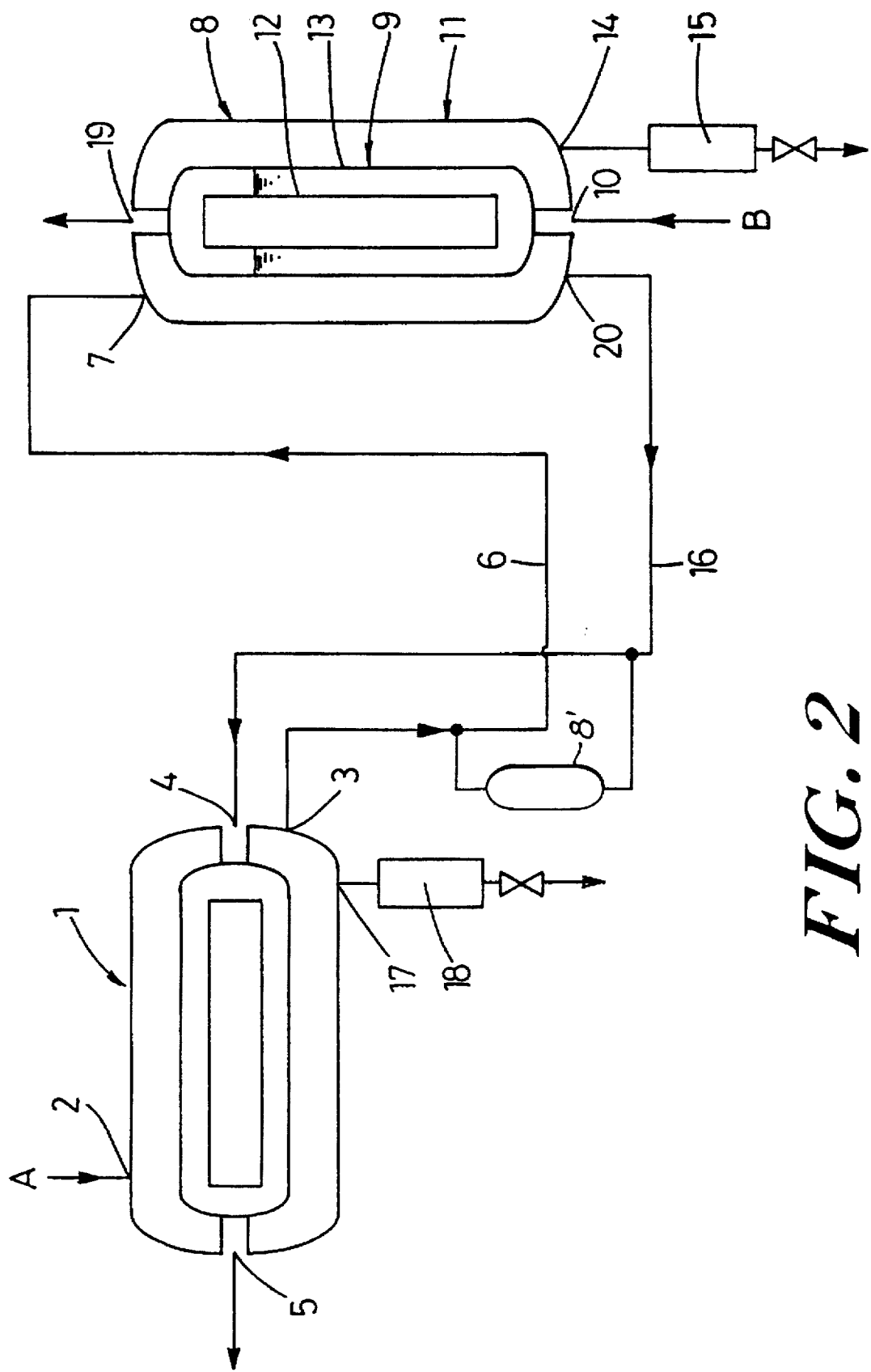

The invention will now be further elucidated with reference to FIG. 1 representing an embodiment of the apparatus according to the invention and with reference to FIG. 2 representing an alternative embodiment of the apparatus according to the invention.

There are many industrial applications requiring the condensation of one or more volatile compounds out of a gas stream. Examples of such applications are, for instance, the removal of volatile compounds released from an ad- and desorption apparatus, and the removal of harmful compounds from waste gas.

The apparatus schematically represented in FIG. 1 is suitable for the efficient and energy-saving removal of a volatile compound out of the gas stream.

The apparatus is provided with a first heat exchanger 1 having a first inlet opening 2 and a first outlet opening 3 for a gas stream A that is to be treated. The heat exchanger further possesses a second inlet opening 4 and a second outlet opening 5 for the supply or discharge of cooling medium. The cooling medium is the gas stream from which the volatile compound has been removed, as will be seen from the following. The first outlet opening 3 is connected via a pipe 6 with a third inlet opening 7 of the second heat exchanger 8. This second heat exchanger 8 possesses a hollow body 9 into which hollow body 9 a liquid second cooling medium B can be fed. In the embodiment represented, the hollow body 9 is an elongated, vertically oriented hollow body 9. During operation of the apparatus the gas stream A flows in a downward direction through the heat exchanger 8 along the hollow body 9. Thus, the gas stream A first comes into contact with the upper part of the hollow body 9 and subsequently with the lower part of the hollow body 9 containing the cooling agent B. Via the fourth inlet opening 10 the cooling agent B can be fed into the hollow body 9 and the liquid level of the cooling agent can be regulated as desired. A high level means a better opportunity for the heat of the gas stream A to be transferred to the cooling medium B, allowing the gas stream A in the bottom of the heat exchanger 8 to reach a low final temperature. A low liquid level of the cooling agent B means less opportunity for heat transfer and the temperature that the gas stream A can drop to is consequently less low. As the degree to which volatile compound or compounds are removed from the gas stream A depends on the temperature of the gas stream A, it is possible to regulate the degree of removal by regulating the liquid level of the cooling agent in the heat exchanger 8.

An important aspect of the invention is the fact that a temperature gradient is formed in the heat exchanger 8, so that the volatile compound cools gradually. This helps to prevent that vapor droplets or minuscule solid particles of volatile compound are formed and carried away with the gas stream. If this happens, the desired separation of volatile compound would not or insufficiently be effectuated, and a further separator would be required. In order to achieve a temperature gradient as gradually as possible, it is advantageous to provide the hollow body 9 with surface enlarging elements such as fins or "hairs". A hairlike structure can be achieved with, for example, Spirotube™ (Spirotech B. V., Helmond, the Netherlands). Hairs or indeed any wire wool like structure, preferably filling the space defined by hollow body 9 and the second hollow body 11 and in thermally conducting contact with hollow body 9, are especially preferred as they are capable of intercepting any inadvertently formed condensate particle or droplet which would otherwise be carried away with the gas stream. Thus the surface enlarging elements have preferably a large surface capable of efficient heat transfer and condensate trapping properties.

According to a preferred embodiment, the hollow body 9 is placed in a second hollow body 11. This reduces warming up of the cooling medium B from ambient heat in cases where a very cold cooling medium B is used.

According to another favourable embodiment, the hollow body 9 is a double-walled hollow body 9, having an inner wall 12 and an outer wall 13 between which cooling medium B is introduced via the fourth inlet opening 10. As the heat transfer is determined by the surface of the hollow body 9, this embodiment facilitates a quick change of the liquid level of the cooling medium B without necessitating the pumpage of much cooling medium. Moreover, if desired, the gas stream A can also be led along the inner wall 12 of the hollow body 9, which means an increase of the cooling surface. For easy control, the first hollow body 9 is preferably an elongated, vertically placed hollow body 9.

Volatile compound condensing out of the gas stream A can leave the heat exchanger 8 via the drain 14 and, if desired, can be stored in a buffer vat 15 for further use or the like. The cooled gas stream A, from which the volatile compound was to be removed, is led via pipe 16 to the second inlet opening 4 of the first heat exchanger 1. In this first heat exchanger 1 the gas stream A, that has been cooled in the second heat exchanger 8 and from which the undesirable volatile compound has been removed, is used as cooling medium for cooling the gas stream still to be treated. At this stage, condensation of one or more volatile compounds out of the gas stream A may already be realized and any condensate can be drained off via the outlet 17 and, if desired, stored in a buffer vat 18.

A practical application of the apparatus was the removal of a lower aldehyde (1000 mg/m$^3$), a glycol compound (150 mg/m$^3$) and water (700 mg/m$^3$) in N$_2$, which gas stream came from an ad- and desorption apparatus. The flow rate of the gas stream was 70 m$^3$/h. The second heat exchanger 8 used in this application possessed a hollow body 9 having an outer wall 13 with a diameter of 106 mm, an inner wall 12 with a diameter of 70 mm and the diameter of the second hollow body 11 was 140 mm.

As cooling medium B liquid nitrogen was used. On entering the heat exchanger 1 via the first inlet opening 2, the gas stream A had a temperature of 100° C. On leaving the first heat exchanger 1, the gas stream had a temperature of 0° C. and was cooled in the second heat exchanger 8 to a temperature of −80° C. After the removal of the pollutants mentioned, the gas stream was introduced into the first heat exchanger 1 via the second inlet opening 4 and left said heat exchanger 1 having a temperature of 15° C. The organic compounds and the water were removed with an efficiency of more than 99%.

By utilizing not only the heat necessary for the evaporation of liquid nitrogen but also the still low temperature of the evaporated liquid nitrogen, the apparatus and method according to the invention can achieve excellent energy efficiency.

By using liquefied gas as cooling medium B, this cooling medium B evaporates and evaporated cooling medium is discharged via a fourth outlet opening 19. In the above example, the temperature of the liquid nitrogen was −70° C.

It may be exhausted into the atmosphere, it may be utilized for another process such as providing an inert atmosphere, etc.

According to a favourable embodiment, the gas stream A is cooled in the first heat exchanger 1 to a temperature near but above the volatile compound's dew point. In the case of a mixture of volatile compounds, this is the temperature of the volatile compound which has the highest dew point. Sublimation (in the frame of this invention this also includes freezing) or condensation does not then occur in the first heat exchanger 1. This only occurs in the second heat exchanger 8, or possibly the heat exchanger 8' discussed below running parallel. This prevents that the first heat exchanger 1 also has to be cleaned periodically.

According to a favourable embodiment of the apparatus according to the invention depicted in FIG. 2 a parallel heat exchanger 8' is provided, which is placed in parallel to the second heat exchanger 8 and which by means of a branch-off is also connected with pipe 6. The apparatus is advantageously operated such that always one of the heat exchangers 8,8' placed in parallel is in operation. For instance if volatile compound has solidified on the heat exchanger 8' then heat exchanger 8 is put into operation. Solid matter can be removed by raising the temperature of the heat exchanger 8' (removal of cooling medium B). After that, the heat exchanger 8' is again ready for use. The moment that heat exchanger 8 needs to be cleaned, the gas stream is led, for instance, by means of valves (not shown) to heat exchanger 8'.

For the removal of solid matter, in particular frozen solid matter, the cooling agent B is removed from, for instance, heat exchanger 8 and the gas stream from which the volatile compound is still to be removed, is led through this heat exchanger 8 for some time longer. This raises the temperature in the heat exchanger 8 so that the solid matter can be removed, for instance, via drain 14. At the same time, the gas stream is pre-cooled which, from an energy point of view, is advantageous, and is subsequently led to the parallel heat exchanger 8' where the volatile compound is removed from the gas stream. Similarly, if the heat exchanger 8 is to be put into operation again, the gas stream from which the volatile compound is removed can first be led through the heat exchanger 8 for its cooling before introducing liquid cooling medium into the heat exchanger 8'. Thanks to the excellent controllability of the heat exchanger, it is moreover possible, if its temperature is not yet low enough, to raise the level of the cooling liquid in order to reach the desired egress temperature of the gas stream.

To the expert, it is clear that the apparatus according to the invention can be used for numerous applications, and that the apparatus as specified in the appended claims may be constructed in many ways. For instance, the hollow body 9 may comprise a plurality of pipes. If desired, the first heat exchanger may also be placed vertically, which further promotes efficient heat exchange. By using heat exchangers 8 placed in series it is further possible to condensate in one heat exchanger 8 one volatile compound and in the successive heat exchanger a following volatile compound.

I claim:

1. A method of condensing a volatile harmful compound out of an input waste gas stream, said method comprising the steps of:

introducing a coolant liquid into a first hollow body of a heat exchanger having a vertical directional component;

passing the input waste gas stream through a second hollow body of said heat exchanger, thereby placing the input waste gas stream in thermal communication with said first hollow body;

controlling the level of said coolant liquid in said first hollow body of said heat exchanger, thereby controlling the rate of thermal communication between said first hollow body and the input waste gas stream;

whereby said level of said coolant liquid within said first hollow body controls the temperature of an output waste gas stream formed by transferring heat from the input waste gas stream.

2. A method according to claim 1 further comprising the step of pre-cooling the input waste gas stream, said step of pre-cooling the input waste gas stream including the steps of:

passing the input waste gas stream through a second inlet opening of a further heat exchanger; and passing the output waste gas stream from said heat exchanger through a second inlet opening of said further heat exchanger;

whereby the input waste gas stream is pre-cooled by the output waste gas stream from said heat exchanger.

3. A method according to claim 2 wherein the step of pre-cooling the input waste gas stream includes the step of pre-cooling the input waste gas stream to a temperature near but above the dew point of the volatile harmful compound to be removed from the input waste gas stream.

4. A method according to claim 3 further comprising the step of cleaning said second heat exchanger by vaporizing a non-gaseous harmful compound from said second heat exchanger, said cleaning step including the steps of:

draining said coolant liquid from said first hollow body of said second heat exchanger;

passing the input waste gas stream through a second hollow body of said second heat exchanger, thereby placing the input waste gas stream in thermal communication with the non-gaseous harmful compound;

whereby the input waste gas stream vaporizes the non-gaseous harmful compound in said second heat exchanger.

5. A method according to claim 3 further comprising the step of cleaning said second heat exchanger by liquefying frozen harmful compound from said second heat exchanger, said cleaning step including the steps of:

draining said coolant liquid from said first hollow body of said second heat exchanger;

passing the input waste gas stream through a second hollow body of said second heat exchanger, thereby placing the input waste gas stream in thermal communication with the frozen harmful compound whereby the input waste gas stream liquefies the non-gaseous harmful compound in said second heat exchanger.

6. A method according to claim 1 wherein said step of passing the input waste gas stream through said second hollow body of said heat exchanger comprises the step of leading the input waste gas stream through said second hollow body of said heat exchanger in a downward direction.

7. A method according to claim 1 wherein the coolant liquid is liquefied gas.

8. A method according to claim 1 wherein said coolant liquid is liquid nitrogen.

9. An apparatus for creating an output waste gas stream from an input waste gas stream by condensing a volatile harmful compound out of the input waste gas stream, said apparatus comprising:

a first heat exchanger having
 a first inlet opening to admit the input waste gas stream into said first heat exchanger,
 a first outlet opening for allowing exit of the input waste gas stream from said first heat exchanger,
 a second inlet opening to admit the output waste gas stream into said first heat exchanger,
 a second outlet opening for allowing exit of the output waste gas stream from said first heat exchanger, a second heat exchanger having
 a first hollow body and a second hollow body, said first hollow body arranged in thermal communication with said second hollow body, and said second hollow body having a vertical directional component,
 a third inlet opening connecting said second hollow body to said first outlet opening of said first heat exchanger,
 a third outlet opening connecting said second hollow body to said second inlet opening of said first heat exchanger,
 a drainage outlet connected to said second hollow body to permit drainage of condensate from the input waste gas stream,
 a fourth inlet opening to allow passage of a liquid coolant into said first hollow body, and
 a fourth outlet opening to allow passage of gas out of said first hollow body.

10. An apparatus according to claim 9 wherein said first hollow body is located inside said second hollow body so that the input waste gas stream entering said second hollow body through said third inlet opening can be led through said second hollow body in a substantially vertical direction along said first hollow body.

11. An apparatus according to claim 9 wherein said first hollow body is a double-walled hollow body having an inner wall and an outer wall so that said liquid coolant can be introduced through said fourth inlet opening into the space between said inner wall and said outer wall of said first hollow body.

12. An apparatus according to claim 9 wherein said first hollow body is an elongated, vertically placed hollow body.

13. An apparatus according to claim 9 further comprising a third heat exchanger connected in parallel to said second heat exchanger.

* * * * *